United States Patent [19]

Takahashi et al.

[11] Patent Number: 4,788,242

[45] Date of Patent: Nov. 29, 1988

[54] POLYVINYL ALCOHOL-BASED REVERSIBLY HYDRATED GEL, HIGHLY WATER-ABSORPTIVE RESIN AND METHOD FOR THE PREPARATION THEREOF

[75] Inventors: Akira Takahashi, Aichi; Tadaya Kato, Mie, both of Japan

[73] Assignee: Shin-Estu Chemical Co., Ltd., Tokyo, Japan

[21] Appl. No.: 105,554

[22] Filed: Oct. 6, 1987

[30] Foreign Application Priority Data

Oct. 6, 1986 [JP] Japan ................................ 61-237525

[51] Int. Cl.$^4$ ............................................... C08F 2/16
[52] U.S. Cl. ..................................... 524/459; 524/503
[58] Field of Search ................................ 524/459, 503

[56] References Cited

U.S. PATENT DOCUMENTS

| | | | |
|---|---|---|---|
| 3,549,578 | 12/1970 | Ehmann ............................... | 524/459 |
| 4,320,040 | 3/1982 | Fujita et al. ......................... | 524/459 |
| 4,472,542 | 9/1984 | Nambu ................................. | 524/459 |

FOREIGN PATENT DOCUMENTS

| | | | |
|---|---|---|---|
| 0056148 | 5/1977 | Japan .................................. | 524/459 |
| 0125287 | 9/1979 | Japan .................................. | 524/459 |
| 0167307 | 10/1982 | Japan .................................. | 524/459 |
| 2030990 | 4/1980 | United Kingdom ............... | 524/459 |

Primary Examiner—Joseph L. Schofer
Assistant Examiner—J. M. Reddick
Attorney, Agent, or Firm—Jules E. Goldberg

[57] ABSTRACT

The polyvinyl alcohol (PVA)-based gel of the invention is reversibly hydrated so that the gel after complete drying can again absorb water to regain the highly elastic gel-like form. Such a reversibly hydrated PVA-base gel can be prepared by impregnating a hydrated gel of PVA with an ethylenically unsaturated, water-soluble ionic monomer together with or without a free-radical polymerization initiator and bringing the thus monomer-impregnated PVA gel under conditions to cause in situ polymerization of the monomer, e.g., by heating or irradiating with actinic rays such as ultraviolet light.

5 Claims, 1 Drawing Sheet

POLYVINYL ALCOHOL-BASED REVERSIBLY HYDRATED GEL, HIGHLY WATER-ABSORPTIVE RESIN AND METHOD FOR THE PREPARATION THEREOF

BACKGROUND OF THE INVENTION

The present invention relates to a polyvinyl alcohol-based reversibly hydrated gel and highly water-absorptive resin as well as a method for the preparation thereof. The reversibly hydrated gel or highly water-absorptive resin is useful as materials for medical treatment and sanitation, materials used in civil engineering and building works, cooling media or cold-keeping agents and so on.

It is known that polyvinyl alcohol, hereinafter referred to as PVA, forms a hydrated gel when an aqueous solution of PVA is subjected to repeated cycles of freezing and thawing or partially dehydrated under reduced pressure in a frozen state (see, for example, Japanese Patent Kokai 57-130542 and 59-56446 and U.S. Pat. No. 4,472,542). Although a hydrated gel of PVA is a rubbery material having excellent elasticity, tensile strength, water-resistance, oil-resistance and other desirable properties, it has several disadvantages, for example, that the water contained in the gel is gradually lost when the gel is prolongedly kept standing to cause disappearance of the desirable properties inherent in the hydrated PVA gel, that the hydration of the PVA gel is irreversible so that a PVA gel once dehydrated can no longer absorb water to return to the hydrated state and that the gelled structure of a hydrated PVA gel is dissolved when the gel is heated at about 80° C. or higher to give a mere aqueous solution of PVA which cannot return to a hydrated gel upon cooling.

Accordingly, it is eagerly desired to develop an improved PVA-based hydrated gel without the above described disadvantages in the conventional hydrated PVA gels.

SUMMARY OF THE INVENTION

The present invention accordingly has an object to provide a solution for the above mentioned problem to be freed from the disadvantages in the conventional PVA-based hydrated gels. The hydration of the PVA-based hydrated gel of the invention is reversible so that the gel even after complete dehydration can readily absorb water to regain the desirable properties as a hydrated gel. Moreover, the gelled structure of the inventive hydrated gel is never dissolved even by heating at an elevated temperature to retain the properties as a hydrated gel.

The polyvinyl alcohol-based reversibly hydrated gel of the invention comprises:

(a) a polyvinyl alcohol having a gelled structure;
(b) water as a hydrating agent of the gelled polyvinyl alcohol; and
(c) a polymer of an ethylenically unsaturated, water-soluble ionic monomer impregnating the hydrated polyvinyl alcohol gel, the polymer being formed by the polymerization of an ethylenically unsaturated, water-soluble ionic monomer in situ in the hydrated polyvinyl alcohol gel.

Such a reversibly hydrated polyvinyl alcohol-based gel can be prepared by the steps of: (i) impregnating a hydrated gel of a polyvinyl alcohol with an ethylenically unsaturated, water-soluble ionic monomer; and (ii) bringing the hydrated gel of the polyvinyl alcohol impregnated with the monomer under conditions to cause polymerization of the monomer.

Further, the highly water-absorptive polyvinyl alcohol-based resin of the invention is obtained by dehydrating the reversibly hydrated polyvinyl alcohol-based gel described above.

DETAILED DESCRIPTION OF THE PREFERRED EMBODIMENTS

Figure 1:
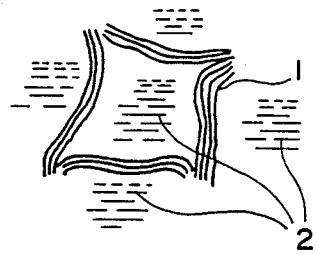
FIG. 1 is a schematic illustration of the network structure of a conventional hydrated PVA gel.

FIG. 1 of the accompanying drawing schematically illustrates a presumptive network structure of a conventional hydrated PVA gel, in which the molecules of PVA 1 form a microcrystalline three-dimensional network structure and the molecules of water 2 are enclosed within the network structure 1. When the water 2 contained within the network structure is lost by evaporation, further crystallization of the PVA microcrystallites forming the network structure may proceed so that the network structure may finally disappear. Such a dried gel of PVA composed of the crystallite-forming molecules can no longer absorb water even when it is put into water not to return to the initial hydrated PVA gel. When the hydrated PVA gel is heated at about 80° C. or higher, the microcystallite structure of the PVA molecules 1 is destroyed and the PVA molecules are dissolved in the water contained within the network structure to give a mere aqueous solution of the PVA. These disadvantages of irreversibility and instability of the hydrated gel structure would be overcome in principle either by reinforcing the once formed network structure of the PVA molecules or by preventing further proceeding of the crystallization of the microcrystallites of PVA molecules even when water is lost from the hydrated gel structure.

On the base of the above described consideration, the inventors have continued extensive investigations with an object to obtain an improved PVA-based hydrated gel leading to the completion of the present invention, the scope of which consists in the in situ polymerization of an ethylenically unsaturated, water-soluble ionic monomer as impregnating a hydrated gel of PVA.

Figure 2:
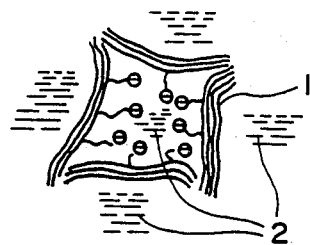
FIGS. 2 and 3 are each a schematic illustration of the network structure of the inventive reversibly hydrated PVA gel.
Figure 3:
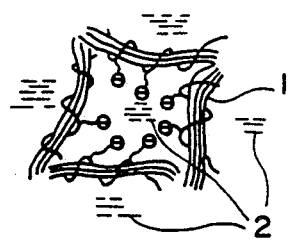

Though not very clear, the mechanism by which the advantages of the present invention are obtained may be as follows. When the ethylenically unsaturated, water-soluble ionic monomer impregnating a hydrated gel of PVA is polymerized in situ, the monomer may be polymerized by grafting to the PVA molecules or polymerized independently from the PVA molecules. The two types of polymerization of course may proceed concurrently. Assuming graft-polymerization of the monomer to the PVA molecules, the resulting structure of the hydrated gel may be schematically illustrated by FIG. 2. By virtue of the electric charges on the ionic groups of the thus grafting polymer segments 3, the crystallite segments 1 of the PVA molecules are under strong repulsion with each other so that crystallization of the PVA microcrystallites is effectively prevented even when the water molecules 2 are lost by evaporation. Assuming independent polymerization of the monomer, on the other hand, the resulting structure of the hydrated gel may be schematically illustrated by FIG. 3. Although the polymer molecules 4 not shown produced by the polymerization of the monomer are not chemically bonded to the PVA molecules 1, they are not free from the PVA molecules 1 but are twisted or entangled with the PVA molecules 1 so that the force of electric repulsion between the microcyrstallite segments of the PVA molecules is obtained in the same manner as in the above mentioned graft-polymerization of the monomer. In addition, an effect of reinforcement of the network structure formed of the crystalline and non-crystalline PVA segments 1 may be obtained by the twisting of the polymeric electrolyte molecules 4 produced by the in situ polymerization of the monomer. When the in situ polymerization of the monomer is performed in the presence of a crosslinking agent, the polymeric electrolyte molecules are also crosslinked to form another network structure so that the overall structure of the hydrated gel may be still more strongly reinforced.

In preparing a PVA-based hydrated gel of the invention, a hydrated gel of PVA is first prepared which is then impregnated with the specific monomer. The PVA used here is not particularly limitative relative to the average degree of polymerization and the degree of saponification provided that it is water-soluble. In this regard, the degree of saponification of the PVA should be at least 50% or, preferably, at least 70%.

The ethylenically unsaturated, water-soluble ionic monomer for the in situ polymerization is exemplified by salts of an unsaturated carboxylic acid, e.g., sodium (meth)acrylate, ammonium (meth)acrylate, trimethylamine (meth)acrylate, triethanolamine (meth)acrylate and the like, an unsaturated sulfonic acid and salt thereof, e.g., vinyl sulfonic acid, sodium vinyl sulfonate, sodium 2-(meth)acrylamido-2-methylpropane sulfonate, sodium 2-(meth)acryloylpropane sulfonate and the like, phosphonate-type anionic monomers, e.g., mono(2-hydroxyethylacrylate) acid phoshate, mono(2-hydroxypropyl methacrylate) acid phosphate and the like, cationic monomers, e.g., N,N,N-trimethyl-N-(meth)acryloyloxyethyl ammonium chloride, N,N,N-triethyl-N-(meth)acryloyloxyethyl ammonium chloride, 2-vinyl pyridine, 4-vinyl pyridine, Nmethyl vinyl pyridinium chloride, of which particularly preferable are sodium acrylate, sodium methacrylate, vinyl sulfonic acid and N,N,N-trimethyl-N-acryloyloxyethyl ammonium chloride.

The in situ polymerization of these monomers impregnating the hydrated PVA gel can be performed by any known method. Namely, the polymerization may proceed by irradiation with actinic rays such as high-energy radiation, electron beams, ultraviolet light and the like or by heating in the presence of a free-radical polymerization initiator. Suitable free-radical polymerization initiators, which should be water-soluble, include salts of tetravalent ceri-um, hydrogen peroxide, 4,4'-azobis(4-cyanovaleric acid) and 2,2'-azobis(2-amidinopropane) hydrochloride as well as the socalled redox-type initiator systems such as the combination of ammonium or potassium persulfate and sodium hydrogensulfite or iron (II) L-ascorbate. The polymerization of the monomer may be carried out in the presence of a water-soluble crosslinking agent as a comonomer such as N,N-methylene bisacrylamide, N,N-methylene bismethacrylamide, ethylene glycol dimethacrylate, trimethylolpropane triacrylate, diethylene glycol diacrylate, propylene glycol dimethacrylate and the like.

The amount of the ethylenically unsaturated, water-soluble ionic monomer impregnating and polymerized in situ in the hydrated gel of PVA should be in the range from 5 to 1000 parts by weight or, preferably from 5 to 100 parts by weight per 100 parts by weight of the PVA as dried. The amounts of the above mentioned crosslinking agent and the free-radical polymerization initiator, when used, should be in the ranges from 0.001 to 10 parts by weight and from 0.1 to 10 parts by weight, respectively, per 100 parts by weight of the ethylenically unsaturated, water-soluble ionic monomer.

In the preparation of the reversibly hydrated PVA-based gel of the invention, a hydrated PVA gel is first prepared by partially dehydrating an aqueous solution of PVA as frozen under reduced pressure and then immersed in an aqueous solution containing the ethylenically unsaturated, water-soluble inonic monomer together with, according to need, a crosslinking agent and/or a free-radical polymerization initiator. It is of course optional that the hydrated PVA gel is immersed successively in aqueous solutions each containing the monomer, crosslinking agent and initiator singly. After pulling up from the monomer solution, the hydrated PVA gel impregnated with the monomer is brought under conditions to cause in situ polymerization of the monomer. For example, the monomer-impregnated hydrated PVA gel is irradiated with actinic rays such as high-energy radiation, electron beams, ultraviolet light and the like when no free-radical polymerization initiator is contained therein. When the monomer-impregnated hydrated PVA gel contains a free-radical polymerization initiator, it is convenient to heat the hydrated gel so as to cause the polymerization of the monomer.

An alternative way to prepare a monomer-impregnated hydrated PVA gel is to repeat the cycles of freezing and thawing of an aqueous solution containing a PVA and an ethylenically unsaturated, water-soluble ionic monomer together with, according to need, a crosslinking agent and a free-radical polymerization initiator or to partially dehydrate such an aqueous solution in a frozen state.

The hydrated gel of PVA should preferably be composed of the PVA and water in a weight ratio in the range from 5:95 to 30:70 irrespective of the method of preparing the gel including the method of dipping a prepared PVA gel in an aqueous solution of the monomer and the method of gel-formation from an aqueous solution of the PVA and the monomer. The partial dehydration of the hydrated PVA gel should be performed to such an extent that 5 to 30% of water contained in the hydrated gel is removed. When polymerization of the monomer impregnating the hydrated PVA gel is performed by heating, the temperature should desirably not exceed 70° C. When a hydrated PVA gel is prepared by repeating the cycles of freezing and thawing of an aqueous PVA solution, the number of the repeated cycles should preferably be at least 3.

The thus obtained reversibly hydrated PVA-based gel of the invention can retain the gel-like form even when it is heated at 80° C. or higher. The most characteristic feature of the inventive hydrated gel consists in the reversibility of the dehydration and hydration processes. When the hydrated gel is completely dehydrated to lose the gel-like appearance, namely, the dehydrated dry gel can absorb water when it is put into water to regain the original gel-like form. This unique property can be utilized for the preparation of a highly water-absorptive resin by compulsorily dehydrating the hydrated gel to give a powdery or granular resin which can be shaped into any desired forms, if necessary. By virtue of these unique properties, the inventive hydrated gel is useful in a variety of applications as a cooling medium or a cold-keeping agent, shock-absorbing or damping material and so on. Further, the highly water-absorptive resin prepared by dehydrating the hydrated gel is useful as a material for medical treatment and sanitation, in civil engineering and building works, in agriculture and horticulture and so on.

In the following, examples and comparative examples are given to illustrate the reversibly hydrated PVA-based gel and the highly water-absorptive resin of the invention in more detail.

EXAMPLE 1

A highly saponified PVA having a degree of saponification of 99.3% and an average degree of polymerization of about 2500 (PVA C-25, a product by Shin-Etsu Chemical Co., Japan) was dissolved in water in a concentration of 20% by weight. The aqueous solution was frozen and kept under a reduced pressure of 0.08 mmHg until one fourth of water was removed by vaporization to give a hydrated gel of PVA composed of 20:60 by weight of PVA and water.

Separately, an aqueous monomer solution was prepared by dissolving 50 parts by weight of sodium acrylate, 0.01 part by weight of N,N-methylene bisacrylamide, 0.5 part by weight of ammonium persulfate and 0.5 part by weight of sodium hydrogensulfite in 49 parts by weight of water. The above prepared hydrated gel of PVA was cut into pieces of a cubic form of 1 cm a side and immersed in the monomer solution chilled at 5° C. for 1 hour followed by pulling up from the solution. The thus obtained monomer-impregnated hydrated gel of PVA contained 48 parts by weight of sodium acrylate and 347 parts by weight of water per 100 parts by weight of the PVA. Then, the gel was kept standing for 4 hours in an oxygen-free atmosphere at 40° C. to effect polymerization of the monomer.

The hydrated gel after the above described polymerization procedure of the monomer was kept in a drying oven at 80° C. so that the gel was dried without intermediately taking a liquid form. When the thus dried piece of the gel was put into water, the gel absorbed water. The re-hydrated gel taken out of water when the weight increase by water absorption was 1.1 g had regained the gel-like form of the hydrated PVA gel before impregnation with the monomer solution having good elasticity.

COMPARATIVE EXAMPLE 1

The hydrated PVA gel prepared in Example 1 before impregnation with the monomer solution was kept in a drying oven at 80° C. so that the gel was dissolved into a liquid form before it was dried up. The thus dried PVA gel could no longer absorb water when it was put into water.

EXAMPLE 2

A low molecular weight PVA having a degree of saponification of 99% and an average degree of polymerization of about 500 (PVA C-05, a product by Shin-Etsu Chemical Co.) was dissolved in water in a concentration of 30% by weight and the aqueous solution was frozen and kept under a reduced pressure of 0.08 mmHg until the frozen solution lost 30% of the initial weight by the vaporization of water to give a hydrated PVA gel composed of 30:40 by weight of the PVA and water.

Separately, an aqueous monomer solution was prepared by dissolving 25 parts by weight of sodium methacrylate, 25 parts by weight of vinyl sulfonic acid and 1.0 part by weight of ethylene glycol dimethacrylate in 49 parts by weight of water. The above prepared hydrated PVA gel was cut into pieces of a cubic form of 1 cm a side and immersed in the aqueous monomer solution for 1 hour followed by pulling up from the monomer solution. The thus monomer-impregnated hydrated gel of PVA contained 22 parts by weight of sodium methacrylate, 23 parts by weight of vinyl sulfonic acid and 177 parts by weight of water per 100 parts by weight of the PVA. The gel was then subjected to irradiation with ultraviolet light for 3 hours to effect polymerization of the monomers. The thus obtained hydrated gel was stable and not dissolved into a liquid form when it was heated at 80° C. The hydrated gel could be dried by freeze-drying and the dried gel could absorb water when it was put into water. The re-hydrated piece of the gel taken out of water when the weight increase by water absorption was 0.8 g had regained the highly elastic gel-like form before drying.

EXAMPLE 3

The experimental procedure was substantially the same as in Example 1 except that the aqueous monomer solution was prepared by dissolving 50 parts by weight of N,N,N-trimethyl-N-acryloyloxyethyl ammonium chloride, 0.1 part by weight of N,N-methylene bisacrylamide and 0.4 part by weight of 2,2-azobis(2-amidinopropane) hydrochloride in 49 parts by weight of water. The monomer-impregnated hydrated gel of PVA contained 51 parts by weight of N,N,N-trimethyl-N-acryloyloxyethyl ammonium chloride and 350 parts by weight of water per 100 parts by weight of the PVA. The monomer-impregnated hydrated gel was kept at 50° C. for 4 hours in an oxygen-free atmosphere to effect polymerization of the monomer. The thus prepared hydrated PVA-based gel could be dried at 80° C. without intermediately taking a liquid form. The dried gel could absorb water when it was put into water and the re-hydrated gel taken out of water when the weight increase by water absorption was 1.0 g per piece had substantially the same properties as before drying.

EXAMPLE 4

An aqueous solution was prepared by dissolving 20 parts by weight of the same PVA as used in Example 1, 10 parts by weight of sodium acrylate, 0.006 part by weight of N,N-methylene bisacrylamide, 0.1 part by weight of ammonium persulfate and 0.1 part by weight of sodium hydrogensulfite in 70 parts by weight of water. The aqueous solution was subjected to 8 times of repeated cycles of freezing and thawing so that a hydrated gel of PVA was obtained. This hydrated gel was kept for 4 hours in an oxygen-free atmosphere at 40° C. to effect polymerization of the monomer impregnating the hydrated gel. The thus obtained gel was cut into cubic pieces of each 1 cm a side and dried by heating in a drying oven at 80° C. without intermediately taking a liquid form. The dried gel could absorb water when it was put into water. The rehydrated gel taken out of water when weight increase by water absorption was 0.8 g per piece had regained the highly elastic gel-like form before drying.

EXAMPLE 5

The experimental procedure was substantially the same as in Example 1 except that the PVA used here was a partially saponified PVA having a degree of saponification of 88% and an average degree of polymerization of about 2400 (PVA PA-24, a product by Shin-Etsu Chemical Co.). The hydrated gel after polymerization of the monomer could be freeze-dried into a dry form which could be pulverized into a white powder. A 1 g portion of this powder was put into 1 liter of water and kept standing for 30 minutes followed by draining of the excess volume of water on a screen of 80 mesh opening. The thus obtained highly hydrated gel contained water in a 850 times by weight relative to its dry weight.

What is claimed is:

1. A reversibly hydrated, polyvinyl alcohol-based gel which comprises:
   (a) a polyvinyl alcohol having a gelled structure;
   (b) water as a hydrating agent of the gelled polyvinyl alcohol; and
   (c) a polymer of an ethylenically unsaturated, water-soluble ionic monomer impregnating the hydrated gel of the polyvinyl alcohol, the polymer being formed by the in situ polymerization of the ethylenically unsaturated, water-soluble ionic monomer impregnating the hydrated gel of the polyvinyl alcohol.

2. The reversibly hydrated polyvinyl alcohol-based gel as claimed in claim 1 wherein the ethylenically unsaturated, watersoluble ionic monomer is selected from the group consisting of sodium acrylate, sodium methacrylate, ammonium acrylate, ammonium methacrylate, trimethylamine acrylate, trimethylamine methacrylate, triethanolamine acrylate, triethanolamine methacrylate, vinyl sulfonic acid, sodium vinyl sulfonate, sodium 2-acrylamide-2-methylpropane sulfonate, sodium 2-methacrylamide-2-methylpropane sulfonate, sodium 2-acryloylpropane sulfonate, sodium 2-methacyloylpropane sulfonate, mono(2-hydroxyethyl acrylate) acid phosphate, mono(2-hydroxypropyl methacrylate) acid phosphate, N,N,N-trimethyl-N-acryloyloxyethyl ammonium choloride, N,N,N-trimethyl-N-methacryloyloxy ethyl ammonium chloride, N,N,N-triethyl-N-acryloyloxyethyl ammonium choloride, N,N,N-triethyl-N-methacryloyloxyethyl ammonium chloride, 2-vinyl pyridine, 4-vinyl pyridine and N-methyl vinyl pyridinium chloride.

3. A method for the preparation of a reversibly hydrated, polyvinyl alcohol-based gel which comprises the steps of:
   (i) impregnating a hydrated gel of a polyvinyl alcohol with an ethylenically unsaturated, water-soluble ionic monomer; and
   (ii) bringing the hydrated gel of the polyvinyl alcohol impregnated with the monomer under conditions to cause polymerization of the monomer.

4. A highly water-absorptive, polyvinyl alcohol-based resin which comprises:
   (a) a polyvinyl alcohol having a network structure; and
   (b) a polymer of an ethylenically unsaturated, water-soluble ionic monomer impregnating the polyvinyl alcohol, the polymer being formed by the polymerization of the ethylenically unsaturated, water-soluble ionic monomer in situ impregnating a hydrated gel of the polyvinyl alcohol.

5. A method for the preparation of a highly water-absorptive, polyvinyl alcohol-based resin which comprises the steps of:
   (i) impregnating a hydrated gel of a polyvinyl alcohol with an ethylenically unsaturated, water-soluble ionic monomer;
   (ii) bringing the hydrated gel of the polyvinyl alcohol impregnated with the monomer under conditions to cause polymerization of the monomer to give a hydrated gel of the polyvinyl alcohol impregnated with a polymer of the monomer; and
   (iii) dehydrating the hydrated gel to dryness.

* * * * *